Figure 3:
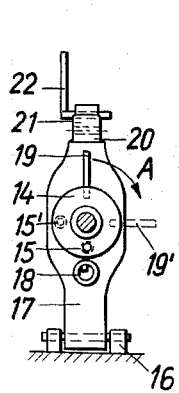

March 22, 1966 G. KLEE 3,241,364

FLOW METER

Filed Oct. 4, 1962

Inventor:
Gerhard Klee
By
Watson, Cole, Grindle + Watson
Attys

3,241,364
FLOW METER
Gerhard Klee, Frankfurt am Main-Ginnheim, Germany, assignor to Samson Apparatebau Aktiengesellschaft, Frankfurt am Main, Germany
Filed Oct. 4, 1962, Ser. No. 228,501
Claims priority, application Germany, Oct. 12, 1961, S 76,242
3 Claims. (Cl. 73—205)

The present invention relates to a flow meter or similar devices as current meters and quantity meters working according to the work pressure principle. The invention relates particularly to the configuration of the work pressure measuring device present in such devices, the membrane- or bellow-shaped measuring device is bound by a measuring spring and connected with an indicator arrangement for indicating the flow speed and quantity. The purpose of the invention is to improve the devices of this kind known up to now above all in respect of the adjustment of the work pressure and the work pressure range.

It is known per se to manufacture measuring devices with different work pressure ranges by the incorporation of measuring springs of different force. By this measure there is not possible of course a fine adjustment. The use of transmissions of different dimensions in the indicator mechanism which is also known, is limited to relatively small adjustment ranges, while by great transmission variations the work exactness of the device could suffer. Furthermore, it is necessary for the practice that modifications of the work pressure range and fine adjustment of the work pressure can be made in a simple manner without a complete dismantling of the device.

This task is solved according to the invention essentially by the fact that on the one hand the measuring spring is accessible for the purpose of modification of the work pressure range outside of each pressure space of the measuring device and is arranged in an interchangeable manner and that on the other hand the transmission between the measuring device and the indicator device can preferably be modified continuously for the purpose of modifying the work pressure within the work pressure range in question.

According to a particularly simple and suitable embodiment of the invention, the measuring device consists in a manner known per se of a diaphragm or the like arranged between two work pressure spaces, with which a rod or the like sealed by spring tubes or the like against the work pressure spaces, at the one extremity of which the interchangeable measuring spring is attached, while its other end is connected respectively coupled by means of the adjustable transmission with the indicator device. The measuring spring may be configured, e.g. as a screw spring or as a leaf spring. Preferably a spring disc is used, which is releasably fastened on the corresponding end of the rod and is clamped, e.g., by means of a releasable flange or the like on the casing of the device. Also the continuously variable transmission can be configurated in different manner. According to a particularly simple and advantageous embodiment this transmission consists, however, of a disc arranged in a rotatable manner on the corresponding extremity of the rod or of an arm or the like carrying an eccentrically arranged pin which engages a lever arm controlling the indicator device, the zero point of which may be adjusted, e.g., by means of a screw.

By means of such a device the flow meter or the like may be adjusted at any time easily and within wide ranges to the desired work pressure. As the means for executing the two possible modifications can be provided on different sides of the device, they are particularly well accessible and can be operated independent of each other. The precision of the device is not jeopardized because of the fact that the transmission modification for obtaining a fine adjustment of the work pressure needs only to be effective within a limited range determined by the measuring spring. Finally deviations of the indicator from the zero point, which can arise e.g. after the interchange of the measuring spring, can be compensated easily by rotating the zero point adjustment.

Figure 1:
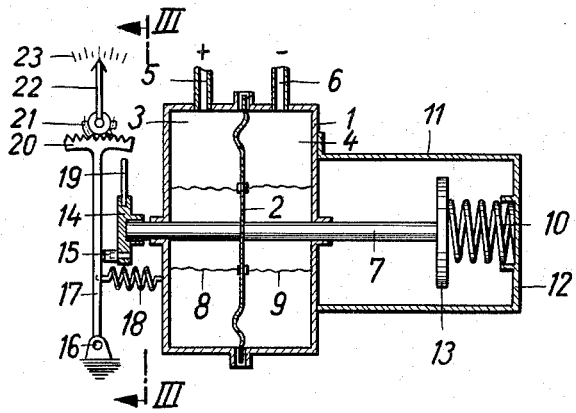
Figure 2:
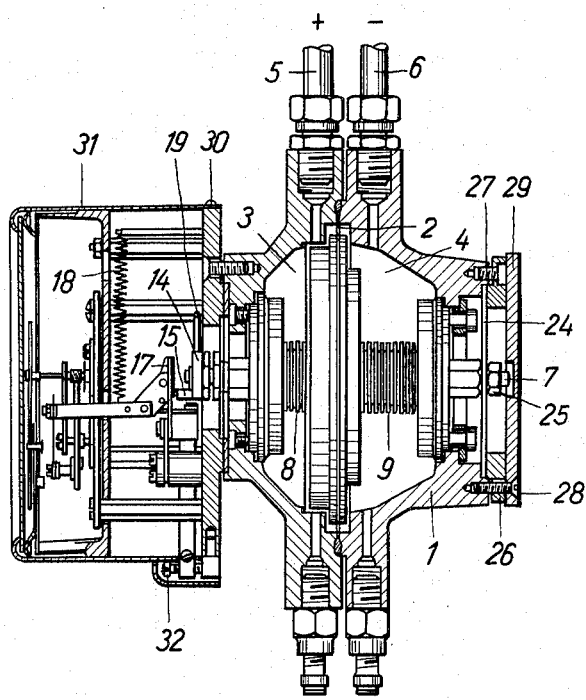

The drawings show the invention on the basis of one embodiment:

FIG. 1 shows a longitudinal section through a flow meter in diagrammatic representation, FIG. 2 is likewise a longitudinal section of a practical embodiment of the flow meter, and FIG. 3 is a side elevation partly in section of a detail taken on line III—III in the direction of the arrows.

The flow meter working according to the work pressure principle needs two devices for measuring the quantity, i.e., a throttle or retaining device not shown in detail in the drawing and the work pressure measuring and indicating device connected with the latter by two pressure lines. This measuring and indicating device consists of a casing 1 in which a diaphragm 2 is clamped-in, which subdivides the interior of the casing in two work pressure spaces 3 and 4 sealed against each other. The work pressure spaces 3 and 4 are connected by the work pressure lines 5 and 6 respectively with the throttle or retraining device or the like.

A rod 7 connected with the middle zone of the diaphragm 2 runs in longitudinal direction through the casing 1 and is lead out of it on both sides by openings in the casing. For sealing the rod 7 against the work pressure spaces 3 and 4 two spring tubes 8 and 9 are provided, which are connected with the diaphragm and the casing walls or covers in a sealing manner.

According to FIG. 1 a coil spring 10 is provided as the measuring spring, which is arranged outside the work pressure spaces of the device, e.g., in an easily interchangeable hood part 11. The coil spring 10 reposes on the one extremity against the bottom 12 of the hood 11 and with the other extremity against a spring plate 13, fastened on the free extremity of the rod 7. After taking-off the hood 11, the measuring spring 10 is at once accessible and easily interchangeable without it being necessary to open the interior of the measuring device.

On the other free extremity of the rod 7 a disk 14 is carried in a rotatable manner, which carries an eccentrically arranged pin 15. This pin engages on a lever arm 17 rotatably carried in the point 16, which serves for controlling the indicator device and is held by a spring 18 in engagement with the pin 15. The disc 14 can be rotated by means of an adjustment pin 19 by hand on the rod 7. According to the situation of the engagement point of the pin 15 as compared with the fulcrum of the lever arm 17, the transmission between the measuring device and the indicator device is continuously modified when the pin 19 is being adjusted. The indicator device is shown here only diagrammatically and consists of a tooth segment 20, arranged on the free end of the lever arm 17, which segment engages into the tooth segment 21 to the indicator 22 running over a graduation 23. The rotatable disc 14 has an eccentrically arranged pin 15 which engages the lever arm 17. As the disc is rotated by means of the handle pin 19 by, for example, 90° to the position shown in broken lines 19', the pin 15 will leave the position 15'. The distance of the point 15' from the axis 16 is greater than the distance of the point 15 from said axis and therefore the transmission ratio will be varied correspondingly.

In the practical embodiment of the flowmeter shown in FIG. 2 a spring disc 24 is provided, as measuring spring, which is fastened releasably by means of a nut 25 of the threaded extremity of the rod 7. On its periphery the spring disc 24 is held by a flange 26 which is fastened by means of screws 27 on the casing 1 of the device. The spring reception room can be covered by a cover plate 29 fastened likewise on the casing 1 of the device by means of screws 28. Also in this embodiment the measure spring 24 is easily accessible after having eliminated the cover plate 29 and can be taken-off easily after having released the flange 26 and the nut 25 in order to be replaced by another measuring spring.

On the opposite free extremity of the rod 7 there is arranged again the rotatably journalled disc 14 with the pin 15, which may be rotated by means of the adjustment pin 19 Similar to FIG. 1 the pin 15 acts on a lever arm 17 which is under the load of the spring 18. The further transmission of the movement from the spring arm 17 to the indicator work is here done by other means, the configuration of which is not interesting in detail for the present invention. In order to modify the transmission only the fastening screws 30 of a hood 31 surrounding the indicator device must be released. After pulling forward the hood 31, the adjustment pin 19 of the disc 14 is easily accessible. In case of possible deviations of the indicator needle from the zero point after having modified the transmission, the zero point may be adjusted again by rotating a zero point regulating screw 32.

The function of the device described hereinbefore is easily understandable on the basis of the description hereinbefore and it is not necessary to give a further explanation. For practical purposes it is generally sufficient to provide three work pressure ranges by alternative incorporation of corresponding measuring springs, within which the working pressure desired in each case may be adjusted by modification of the transmission between measuring and indicating device.

The configuration of the device may be varied in detail without leaving the scope of the invention.

I claim:

1. Flow meter or the like with a work pressure measuring device with a diaphragm element which cooperates with a measuring spring and connected with an indicator device, comprising a casing, a measuring spring to modify the work pressure range outside of the pressure space of the measuring device in an interchangeable and easily accessible manner, a transmission between the measuring device and the indicator which is adapted to be continuously variable in order to modify the work pressure within the work pressure range, the measuring device consisting of a diphragm mounted in the casing to form two work pressure spaces, a pair of spring tubes connected one on each side of the diaphragm and the casing, a rod connected to the diaphragm and within the spring tubes and on each side of the diaphragm to seal the rod against the work pressure spaces, the measuring spring engaging the rod and the latter being connected by means of the variable transmission with the indicator device, the continuously variable transmission consisting of a disk carried rotatably on the corresponding extremity of a rod, said disk having an eccentrically arranged pin, which engages on a lever arm controlling the indicator device.

2. Flow meter or the like with a work pressure measuring device with a diaphragm element which cooperates with a measuring spring and connected with an indicator device, comprising a casing, a measuring spring to modify the work pressure range outside of the pressure space of the measuring device in an interchangeable and easily accessible manner, a transmission between the measuring device and the indicator which is adapted to be continuously variable in order to modify the work pressure within the work pressure range, the measuring device consisting of a diaphragm mounted in the casing to form two work pressure spaces, a pair of spring tubes connected one on each side of the diaphragm and the casing, a rod connected to the diaphragm and within the spring tubes and on each side of the diaphragm to seal the rod against the work pressure spaces, the measuring spring engaging the rod and the latter being connected by means of the variable transmission with the indicator device, the continuously variable transmission consisting of a disk carried rotatably on the corresponding extermity of a rod, said disk having an eccentrically arranged pin, which engages on a lever arm controlling the indicator device, the disk being rotatable by means of an adjustment pin fixed thereon.

3. Flow meter or the like with a work pressure measuring device with a diaphragm element which cooperates with a measuring spring and connected with an indicator device, comprising a casing, a measuring spring to modify the work pressure range outside of the pressure space of the measuring device in an interchangeable and easily accessible manner, a transmission between the measuring device and the indicator which is adapted to be continuously variable in order to modify the work pressure within the work pressure range, the measuring device consisting of a diaphragm mounted in the casing to form two work pressure spaces, a pair of spring tubes connected one on each side of the diaphragm and the casing, a rod connected to the diagram and within the spring tubes and on each side of the diagram to seal the rod against the work pressure spaces, the measuring spring engaging the rod and the latter being connected by means of the variable transmission with the indicator device, the continuously variable transmission consisting of a disk carried rotatably on the corresponding extremity of a rod, said disk having an eccentrically arranged pin, which engages on a lever arm controlling the indicator device, and the zero point of the lever arm of the indicator device being adjustable by means of a zero point adjustment screw.

References Cited by the Examiner
UNITED STATES PATENTS

| | | | |
|---|---|---|---|
| 873,034 | 12/1907 | Ely | 73—415 |
| 1,323,119 | 11/1919 | Sundbaum | 73—407 X |
| 2,190,506 | 2/1940 | Wurr. | |
| 2,509,078 | 5/1950 | Stover | 73—205 |
| 2,561,700 | 7/1951 | Hughes | 73—397 X |
| 2,630,820 | 4/1953 | Gray. | |
| 2,695,981 | 11/1954 | Smott | 73—205 |
| 3,104,546 | 9/1963 | Hauptman | 73—397 X |

FOREIGN PATENTS 1,223,697  2/1960  France.

RICHARD C. QUEISSER, *Primary Examiner.*

DAVID SCHONBERG, *Examiner.*